United States Patent [19]
Smith et al.

[11] Patent Number: 5,418,959
[45] Date of Patent: May 23, 1995

[54] INSTRUCTION OPERATION SIZE OPTIMIZATION

[75] Inventors: Kevin J. Smith, Boulder Creek; Hugh R. Kenner, Cupertino, both of Calif.

[73] Assignee: Intel Corporation, Santa Clara, Calif.

[21] Appl. No.: 983,466

[22] Filed: Nov. 30, 1992

[51] Int. Cl.⁶ .............................................. G06F 9/44
[52] U.S. Cl. .................... 395/700; 395/500; 364/DIG. 1; 364/280.4; 364/280.5; 364/280
[58] Field of Search .................. 395/700, 500; 364/DIG. 1

[56] References Cited

U.S. PATENT DOCUMENTS

| | | | |
|---|---|---|---|
| 4,667,290 | 5/1987 | Goss et al. | 364/300 |
| 5,193,190 | 3/1993 | Janczyn et al. | 395/700 |
| 5,287,510 | 2/1994 | Hall et al. | 395/700 |
| 5,313,614 | 5/1994 | Goettelmann et al. | 395/500 |

*Primary Examiner*—Kevin A. Kriess
*Assistant Examiner*—Majid Banankhah
*Attorney, Agent, or Firm*—Blakely, Sokoloff, Taylor & Zafman

[57] ABSTRACT

An improved optimizer, in conjunction with a set of initial instruction ordinal assignment policies, a set of instruction ordinal adjustment policies and a set of instruction ordinal to instruction operation size mapping policies, is provided to the code generator of a compiler of the target machine. In addition to logic for performing standard optimizations, the improved optimizer further comprises logic for assigning initial instruction ordinals to instructions in the code being generated for the program being compiled in accordance to the assignment policies, iteratively adjusting the assigned instruction ordinals in accordance to the adjustment policies until they converge into a set of compatible and optimized instruction ordinals, and mapping the final instruction ordinals to instruction operation sizes, inserting additional code where necessary, in accordance to the mapping policies.

32 Claims, 16 Drawing Sheets

80

| Ordinal Name | Ordinal Description |
|---|---|
| BYTEsize | Unsigned byte |
| SIGNBsize | Signed byte |
| BYTE_plus_size | Result > 8 bits, operands were 8 bits |
| HWsize | Unsigned short |
| SIGNHsize | Signed short |
| ZEROSsize | Signed short used safely as unsigned |
| HW_plus_size | Result > 16 bits, operands were 16 bits |
| ZEROXsize | Need to zero extend before 32 bit operation |
| SIGNXsize | Need to sign extend before 32 bit operation |
| WDsize | 32 bit operation |

82a — BYTEsize
82b — SIGNBsize
82c — BYTE_plus_size
82d — HWsize
82e — SIGNHsize
82f — ZEROSsize
82g — HW_plus_size
82h — ZEROXsize
82i — SIGNXsize
82j — WDsize

*Figure 9*

| | Instruction Type | Initial Instruction Ordinal Assignment Rules |
|---|---|---|
| 82a | ADD, SUB, etc. | BYTE_plus_size |
| 82b | Byte load sign extend | SIGNBsize |
| 82c | Byte load zero extend | BYTEsize |
| 82d | 16 bit load sign extend | SIGNHsize |
| 82e | 16 bit load zero extend | HWsize |
| 82f | Other loads | WDsize |
| 82g | Stores | Size of item stored (BYTEsize, HWsize, or WDsize) |
| 82h | Sign extend convert | SIGNHsize or SIGNBsize |
| 82i | Zero extend convert | BYTEsize or HWsize |
| 82j | Enter Constant | WDsize<br>if(-8000<=n<=7fff) then SIGNHsize<br>if(0<=n<=7fff) then HWsize<br>if(-80<=n<=7f) then SIGNBsize<br>if(0<=n<=7f) then BYTEsize |
| 82k | Compare - eq, ne | zero |
| 82l | Compare - gt,ge,lt,le | zero |
| 82m | Others (includes XOR, and, move, shift, etc.) | If instruction has byte form then zero else, WDsize |

*Figure 10*

| Instruction Type | Instruction Ordinal Adjustment Rules |
|---|---|
| 90a — ADD, SUB, etc. | if (p_size>i_size) {<br>  i_size=p_size<br>  if (p_size<=HW_plus_size) i_size=HW_plus_size<br>  if (p_size<=BYTE_plus_size) i_size=BYTE_plus_size<br>} |
| 90b — Byte load sign extend | if (p_size>BYTE_plus_size) i_size=SIGNXsize |
| 90c — Byte load zero extend | if (p_size==SIGNBsize) i_size=ZEROXsize<br>if (p_size>BYTE_plus_size) i_size=ZEROXsize |
| 90d — 16 bit load sign extend | if (p_size==ZEROSsize) i_size=ZEROXsize<br>if (p_size>HW_plus_size) i_size=SIGNXsize |
| 90e — 16 bit load zero extend | if (p_size==SIGNHsize) i_size=ZEROXsize<br>if (p_size==ZEROSsize) i_size=ZEROXsize<br>if (p_size>HW_plus_size) i_size=ZEROXsize |
| 90f — Other loads | if (p_size>i_size) i_size=p_size |
| 90g — Stores | USE INITIAL SIZE ASSIGNMENT |

| | Instruction Type | Instruction Ordinal Adjustment Rules |
|---|---|---|
| 90h - | Sign extend convert | if (p_size>i_size) i_size=p_size |
| 90i - | Zero extend convert | if (p_size>i_size) i_size=p_size |
| 90j - | Enter constant | if (p_size>=WDsize) i_size=p_size<br>if (-8000<=n<=7fff and p_size=ZEROSsize) i_size=p_size<br>if (-8000<=n<=7fff and p_size>HW_plus_size) i_size=p_size<br>if (-80<=n<=7f and p_size>BYTE_plus_size) i_size=p_size |
| 90k - | Compare-eq,.ne | if (p_size>i_size) {<br>   i_size=p_size<br>   if (p_size=HWsize) i_size=ZEROXsize<br>   if (p_size=SIGNHsize) i_size=ZEROSsize<br>   if (p_size=HW_plus_size or p_size=BYTE_plus_size) i_size=SIGNXsize<br>} |
| 90l - | Compare-gt,ge,lt,le | if (p_size>i_size and p_size !=ZEROSsize) {<br>   i_size = p_size<br>   if (i_size = HWsize) i_size=ZEROXsize<br>   if (i_size = HW_plus_size or BYTE_plus_size) i_size=SIGNXsize |
| 90m - | Others | if (p_size>i_size) i_size=p_size |

*Figure 11b*

| Instruction Type | Instruction Ordinal to Instruction Operation Size Mapping Rules* |
|---|---|
| BYTE LOAD SIGN EXTEND | OPERATION = LOAD BYTE<br>IF (i_size > BYTE_PLUS_size)<br>   ADD CODE TO<br>      SIGN-EXTEND 8 BIT REG TO 32 BIT REG |
| BYTE LOAD ZERO EXTEND | OPERATION = LOAD BYTE<br>IF (i_size > BYTE_PLUS_size)<br>   ADD CODE TO<br>      CLEAR REGISTER BEFORE LOAD |
| 16 BIT LOAD SIGN EXTEND | IF (i_size = ZEROSsize)<br>   ADD CODE TO<br>      CLEAR RESULT REGISTER<br>      LOAD 16 BITS INTO RIGHT HALF OF RESULT REGISTER<br>ELSE<br>   OPERATION = LOAD HALF WORD<br>   IF (i_size > HW_PLUS_size)<br>      ADD CODE TO<br>         SIGN-EXTEND 16 BIT REG TO 32 BIT REG |

* IF NOT SPECIFIED OPERATION SIZE = WORD

*Figure 12a*

| Instruction Type | Instruction Ordinal to Operation Size Mapping Rules |
|---|---|
| 16 BIT LOAD ZERO EXTEND | IF (i_size <= HW_plus_size)<br>  OPERATION = LOAD HALFWORD<br>ELSE<br>  ADD CODE TO<br>  CLEAR RESULT REGISTER<br>  LOAD 16 BITS INTO THE RIGHT HALF OF RESULT REGISTER |
| OTHER LOADS | OPERATION = LOAD WITH ORIGINAL SIZE |
| STORES | OPERATION = STORE WITH ORIGINAL SIZE |
| SIGN EXTEND CONVERT | IF (i_size = ZEROSsize) OPERATION = ZERO EXTEND CONVERT<br>IF (i_size <= HW_plus_size AND 16 BIT EXTEND AND SIZE (OPEREND) <= HW_plus_size) DELETE INSTRUCTION<br>IF (i_size <= BYTE_plus_size AND 24 BIT EXTENDED AND SIZE (OPEREND) <= BYTE_plus_size) DELETE INSTRUCTION |
| ZERO EXTEND CONVERT | IF (i_size <= HW_plus_size AND 16 BIT EXTEND AND SIZE (OPEREND) <= HW_plus_size) DELETE INSTRUCTION<br>IF (i_size <= BYTE_plus_size AND 24 BIT EXTEND AND SIZE (OPEREND) <= BYTE_plus_size) DELETE INSTRUCTION |

| Instruction Type | Instruction Ordinal to Operation Size Mapping Rules |
|---|---|
| MOVE | IF (i_size <= BYTE_plus_size)<br>OPERATION = MOVE BYTE |
| ENTER CONSTANT | IF (i_size <= BYTE_plus_size)<br>OPERATION = ENTER IMMEDIATE BYTE<br>ELSE IF (i_size = ZEROSsize)<br>CONSTANT = CONSTANT & 0XFF |
| COMPARE - eg, ne | IF (i_size < BYTE_plus_size)<br>OPERATION = COMPARE BYTE |
| COMPARE - gt, ge, lt, le | IF (i_size = HWsize OR i_size = SIGN Hsize)<br>ADD CODE TO<br>SHIFT OPERANDS LEFT BY 16 BITS WITH ZERO FILL<br>ELSE IF (i_size < BYTE_plus_size)<br>OPERATION = COMPARE BYTE |
| OTHERS (INCLUDES ADD, SUB, XOR, ETC) | IF (i_size <= BYTE_plus_size AND<br>INSTRUCTION HAS A BYTE VERSION)<br>OPERATION = BYTE VERSION |

| Instruction Number | Instruction Type | Initial Instruction Ordinal | Final Instruction Ordinal | Final Instruction Operation Size | Code Added |
|---|---|---|---|---|---|
| 1 | Byte load sign extend | SIGNBsize | SIGNXsize | BYTE LOAD THEN INSERT SIGN-EXTENSION | Yes |
| 2 | Byte load zero extend | BYTEsize | ZEROXsize | CLEAR REGISTER THEN LOAD BYTE (ZERO-EXTEND) | Yes |
| 3 | Compare-gt | None | SIGNXsize | Word | No |

94a — row 1
94b — row 2
94c — row 3

*data flowing from instructions 1 and 2 to instruction 3

*Figure 13a*

INSTRUCTION OPERATION SIZE OPTIMIZATION

BACKGROUND OF THE INVENTION

1. Field of the Invention

The present invention relates to the field of computer systems, in particular, computer systems that support multiple instruction operation sizes. More specifically, the present invention relates to optimizations performed by compilers of these computer systems.

2. Background

Many computer systems support multiple instruction operation sizes. Beside different instructions, such as Add verses Load, having different instruction operation sizes, an instruction, such as Load, may be supported in different instruction operation sizes, such as 8 bit Loads with or without sign extend, 16 bit Loads with or without sign extend, and 32 bit Loads, Additionally, it is not uncommon that instruction operations of a particular size, such as 16 bit instruction operations, are less efficient than instruction operations of another size, such as 32 bit instruction operations. Also, zero extended loads are more efficient than sign-extended loads. Traditionally, the way compilers handle the smaller data, i.e. those smaller than a word, is to sign-extend or zero-extend the data, depending on their types, making each one of them a word long, even though some of the extensions are unnecessary. For example, on a computer system having 32-bit word size, a traditional compiler would extend the instruction operation size of an instruction producing a value to 32 bits even if all uses of the value only depend on the rightmost eight bits.

Thus, it is desirable if a compiler in generating code for a particular target machine can optimize the instruction operation sizes of the various instruction operations in the generated code, avoiding unnecessary extensions of smaller data, and the less efficient instruction operations. As will be disclosed, the present invention provides a method and apparatus for optimizing instruction operation sizes of various instructions in the generated code of a compiled program that achieves the desired results described above.

SUMMARY OF THE INVENTION

A method and apparatus for optimizing instruction operation sizes of various instructions in the generated code of a compiled program is disclosed. The disclosed method and apparatus has particular application to compilers whose target machines support multiple instruction operation sizes. Under the disclosed method and apparatus, unnecessary extensions of data smaller than a word and less efficient instruction operation sizes are advantageously avoided.

The advantageous results are achieved by providing an improved optimizer to the code generator of a compiler of the target machine, in conjunction with a set of instruction ordinals, a set of initial instruction ordinal assignment policies, a set of instruction ordinal adjustment policies, and a set of instruction ordinal to instruction operation size mapping policies. The instruction ordinals are used by the improved optimizer to determine the optimum instruction operation sizes for the various instructions of the program being compiled. The initial instruction ordinal assignment policies indirectly reflect the preferred instruction operation sizes of the various instruction types of the target machine. The instruction ordinal adjustment policies provide adjustment guidelines on avoiding unnecessary extensions of data smaller than a word, and the less efficient operation sizes, in particular, substituting zero-extension for sign extension whenever appropriate. The mapping policies are used to map the final instruction ordinal assignments to actual instruction operation sizes. In addition to logic for performing standard optimizations, the improved optimizer further comprises logic for assigning initial instruction ordinals to instructions in the code being generated for the program being compiled in accordance to the assignment policies, iteratively adjusting the instruction ordinals in accordance to the adjustment policies until they converge into a set of compatible and optimized instruction ordinals, and mapping the final instruction ordinal assignments to actual instruction operation sizes.

In the presently preferred embodiment, the optimizer iterates the instruction ordinal adjustments with a first-in-first-out instruction ordinal propagation list comprising a plurality of instruction ordinal and propagation target pairs. The optimizer constructs the initial instruction ordinal propagation list based on the initial instruction ordinal assignment, and the data flow relationship of the instructions. The optimizer then iteratively removes these instruction ordinal and propagation target pairs from the front of the list, one at a time, and conditionally adjusts the instruction ordinal of the propagation target in accordance to the adjustment policies. Each time an adjustment is made to the instruction ordinal of the target, one or more instruction ordinal propagation entries are added to the front of the instruction ordinal propagation list. The new instruction ordinal propagation entries correspond to the instructions generating operands for the adjusted instruction, and instruction using the result of the adjusted instruction. This process continues until the optimizer has processed all instruction ordinal propagation entries in the list.

BRIEF DESCRIPTION OF THE DRAWINGS

The objects, features, and advantages of the present invention will be apparent from the following detailed description of the presently preferred and alternate embodiments of the invention with references to the drawings in which:

FIG. 9 illustrates an exemplary set of instruction ordinals for the exemplary computer system of FIG. 1.

FIG. 10 illustrates an exemplary set of initial instruction ordinal assignment policies for the exemplary computer system of FIG. 1.

FIGS. 11a–11b illustrate an exemplary set of instruction ordinal adjustment policies for the exemplary computer system of FIG. 1.

FIGS. 12a–12c illustrate an exemplary set of instruction ordinal to instruction operation size mapping policies for the exemplary computer system of FIG. 1.

FIGS. 13a–13b illustrate an exemplary determination of instruction operation sizes under the presently preferred embodiment of the present invention.

DETAILED DESCRIPTION PRESENTLY PREFERRED AND ALTERNATE EMBODIMENTS

A method and apparatus for optimizing instruction operation sizes of various instructions in the generated code of a compiled program is disclosed. The disclosed method and apparatus has particular application to compilers whose target machines support multiple instruction operation sizes. Under the disclosed method and apparatus, unnecessary extensions of data smaller than a word and less efficient instruction operation sizes are advantageously avoided. Furthermore, sign-extended loads are advantageously replaced by zero-extended loads whenever it is appropriate. In the following description for purposes of explanation, specific numbers, materials and configurations are set forth in order to provide a thorough understanding of the present invention. However, it sill be apparent to one skilled in the art that the present invention may be practiced without the specific details. In other instances, well known systems are shown in diagrammatical or block diagram form in order not to obscure the present invention unnecessarily.

Figure 1:
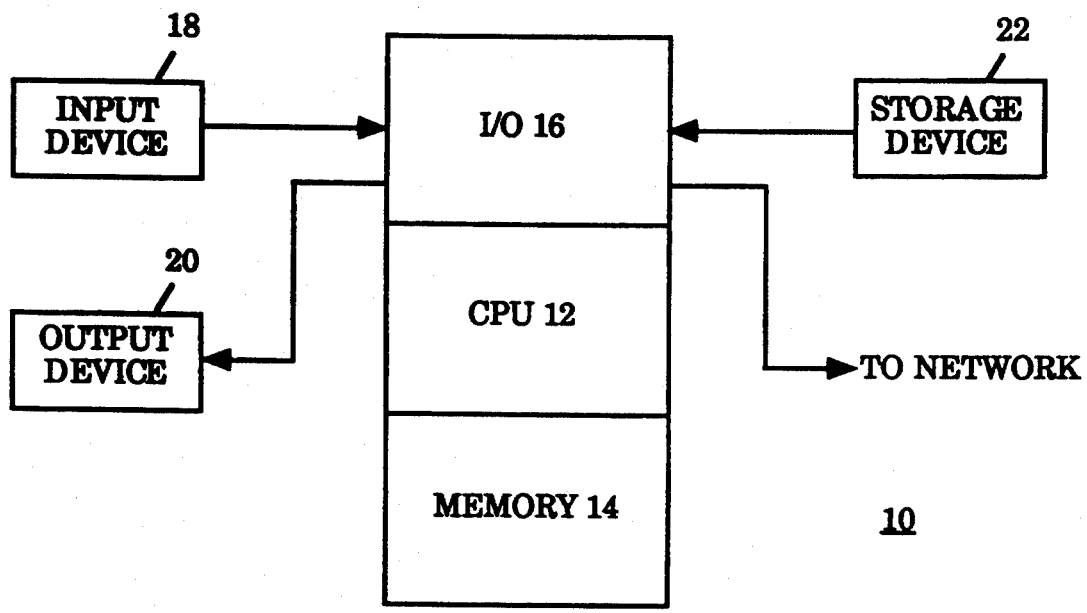
FIG. 1 illustrates an exemplary computer system incorporated with the teachings of the present invention.

Referring now to FIG. 1, a block diagram illustrating an exemplary computer system incorporated with the teachings of the present invention is shown. The exemplary computer system 10 comprises a central processing unit (CPU) 12, a memory 14, and an I/O module 16. Additionally, the exemplary computer system 10 also comprises a number of input/output devices 18 and 20, and a number of storage devices 22. The CPU 12 is coupled to the memory 14 and the I/O module 16. The input/output devices, 18 and 20, and the storage devices 22 are also coupled to the I/O module 16. The I/O module 16 in turn is coupled to a network.

The exemplary computer system 10 supports multiple instruction operation sizes. That is, certain instructions operate in one instruction operation size while other instructions operate in different instruction operation sizes. For example, Add and Subtract instructions may have one instruction operation size while Load and Store instructions may have a different instruction operation size. Additionally, certain instructions are supported in multiple instruction operation sizes. For example, Load and Store instructions may be supported in 8 bits, 16 bits or 32 bits.

Except for the manner they are used to practice the present invention, the CPU 12, the memory 14, the I/O module 16, the input/output devices, 18 and 20, the storage devices 22, and the network, are intended to represent a broad category of these hardware elements found in most computer systems. The constitutions and basic functions of these elements are well known and will not be otherwise further described here.

Figure 2:
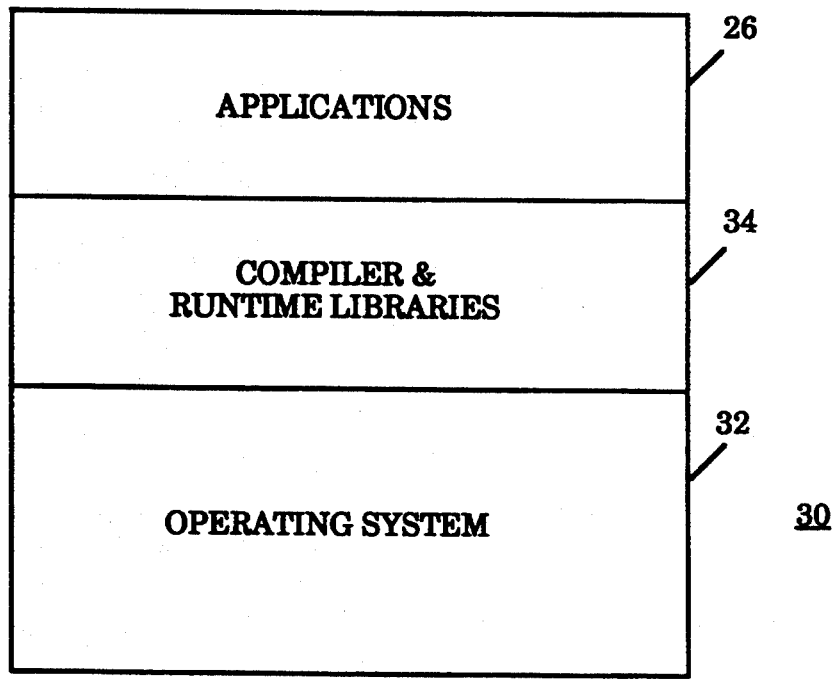
FIG. 2 illustrates the software elements of the exemplary computer system of FIG. 1.

FIG. 2 illustrates the software elements of the exemplary computer system of FIG. 1. Shown are application programs 26 compiled using the compiler 34. The compiled application programs 26 access the runtime libraries 34 for services during execution, which in turn access the operating system 32 for system services. The compiler 34 also accesses the operating system 32 for system services during compilation of application programs 26. Similar to the hardware elements, except for teachings of the present invention incorporated in the compiler 34, these software elements are intended to represent a broad category of similar software elements found in most computer systems. The constitutions and basic functions of these elements are well known and will not be otherwise further described here.

Figure 3:
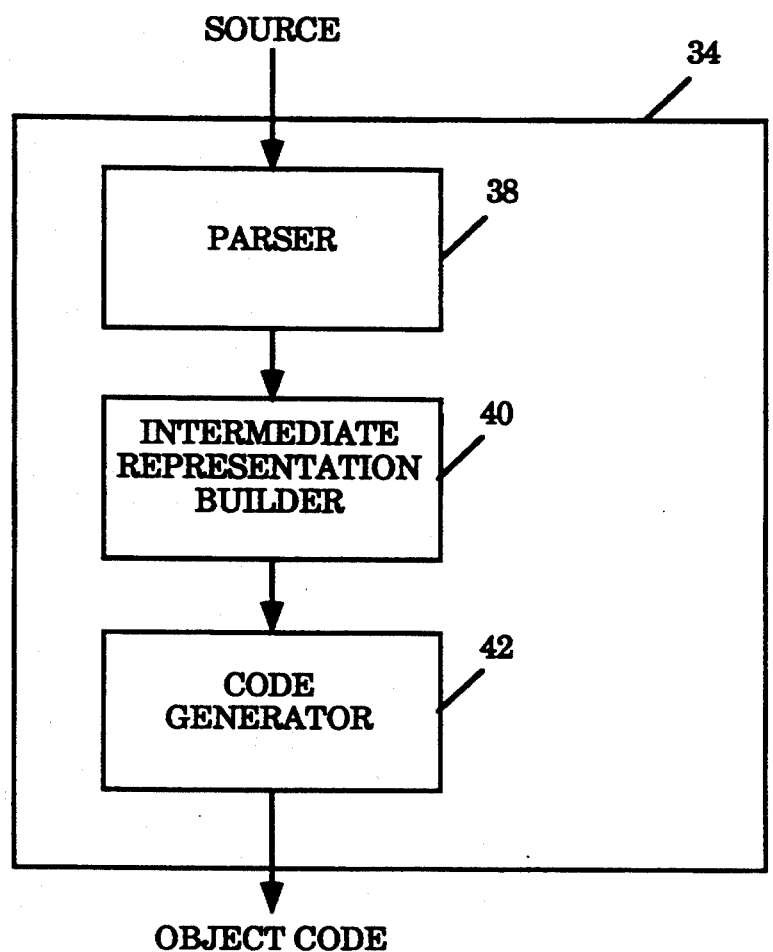
FIG. 3 illustrates one embodiment of the exemplary compiler of FIG. 2.

Referring now to FIG. 3, a block diagram illustrating one embodiment of the compiler of FIG. 2 is shown. In this embodiment, the compiler 34 comprises a parser 38, an intermediate representation builder 40, and a code generator 42. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. Except for teachings of the present invention incorporated in the code generator 42, these components are intended to represent a broad category of similar components found in most compilers. The constitutions and basic functions of these components are well known and will not be otherwise further described here.

Figure 4:
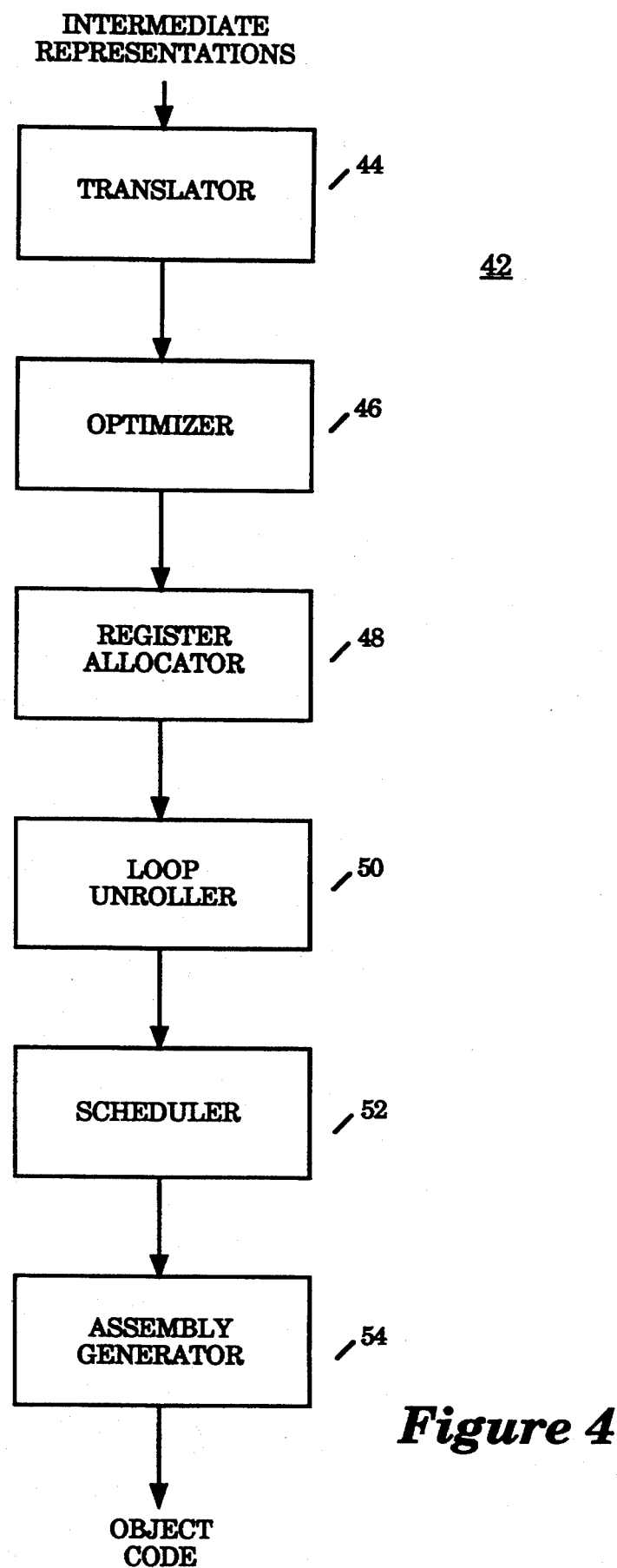
FIG. 4 illustrates one embodiment of the exemplary code generator of FIG. 3.

Referring now FIG. 4, a block diagram illustrating one embodiment of the code generator of FIG. 3 is shown. In this embodiment, the code generator 42 comprises a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. In particular, the optimizer 46 optimizes the instruction operation sizes for the instructions in the code being generated for the program being compiled. In other words, the optimizer 46 determines a set of compatible and optimized instruction operation sizes for the instructions to be generated that, among other things, avoids unnecessary extensions of data smaller than a word, and the less efficient instruction operation sizes supported by the exemplary computer system of FIG. 1.

The register allocator 48 receives the optimized intermediate representations and associated information as inputs. In response, it allocates registers of the exemplary computer system of FIG. 1 to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the exemplary computer system of FIG. 1. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled.

Except for the teachings of the present invention incorporated in the optimizer 46, the translator 44, the register allocator 48, the loop unroller 50, the scheduler 52 and the assembly code generator 54, are intended to represent a broad category of similar modules found in most code generators. The constitutions and basic functions of these modules are well known and will not be otherwise further described here.

Additionally, while for ease of understanding, the code generator 42 is being described with the above described embodiment which allocates registers before unrolling the loops in the instructions being generated, and scheduling instructions for parallelism, based on the descriptions to follow, it will be appreciated that the present invention may be practiced with other register allocation, loop unrolling and scheduling approaches having different register allocation, loop unrolling and scheduling order, including but not limited to the integrated register allocation, loop unrolling and scheduling approach described in the copending U.S. patent application, Ser. No. 07/982,962, filed Nov. 30, 1992, entitled Integrating Register Allocation, Instruction Scheduling, Instruction Reduction, And Loop Unrolling.

Figure 5:
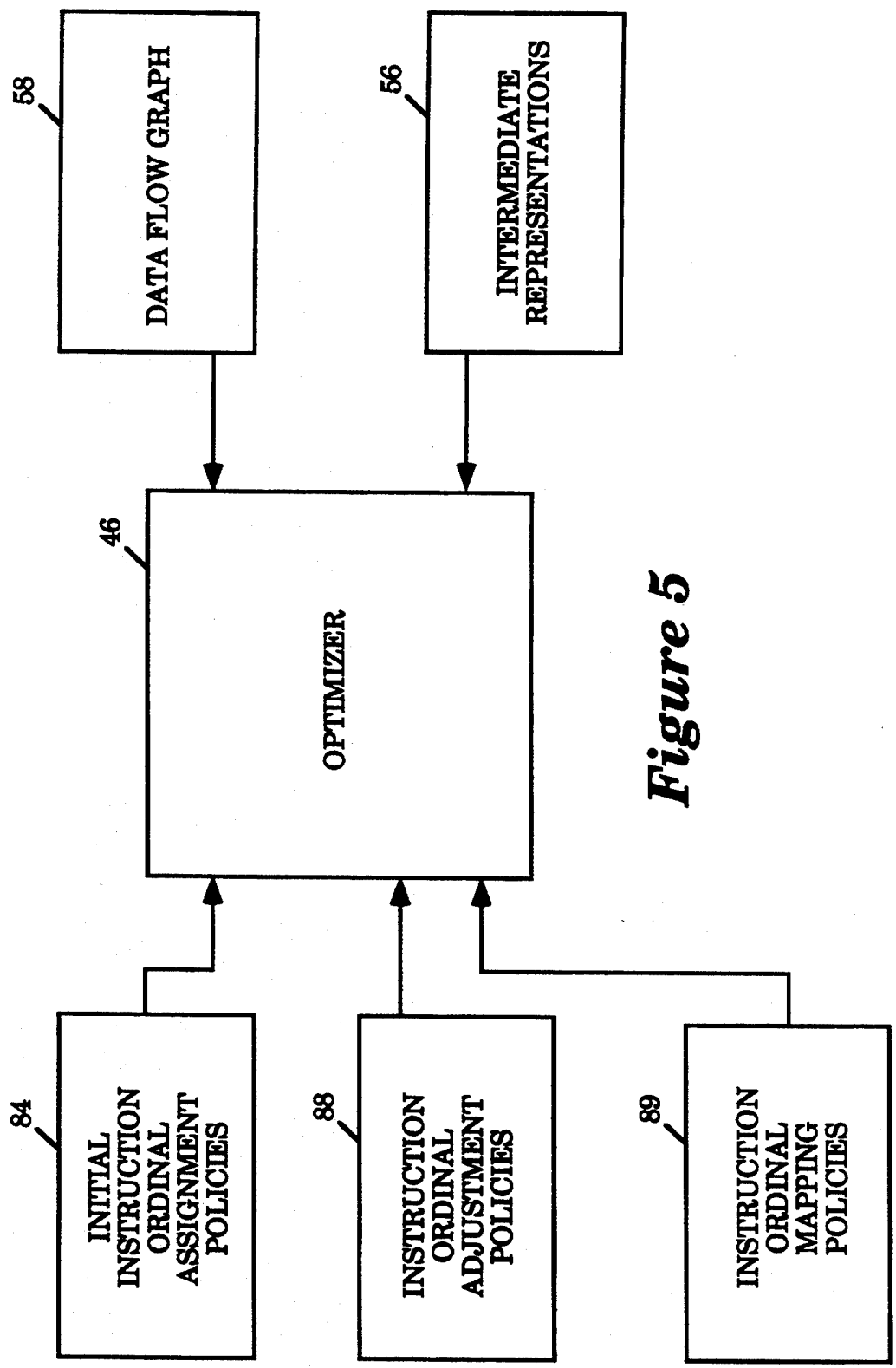
FIG. 5 illustrates the improved optimizer, the set of initial instruction ordinal assignment policies, the set of instruction ordinal adjustment policies, and the set of instruction ordinal mapping policies of the present invention.
Figure 6:
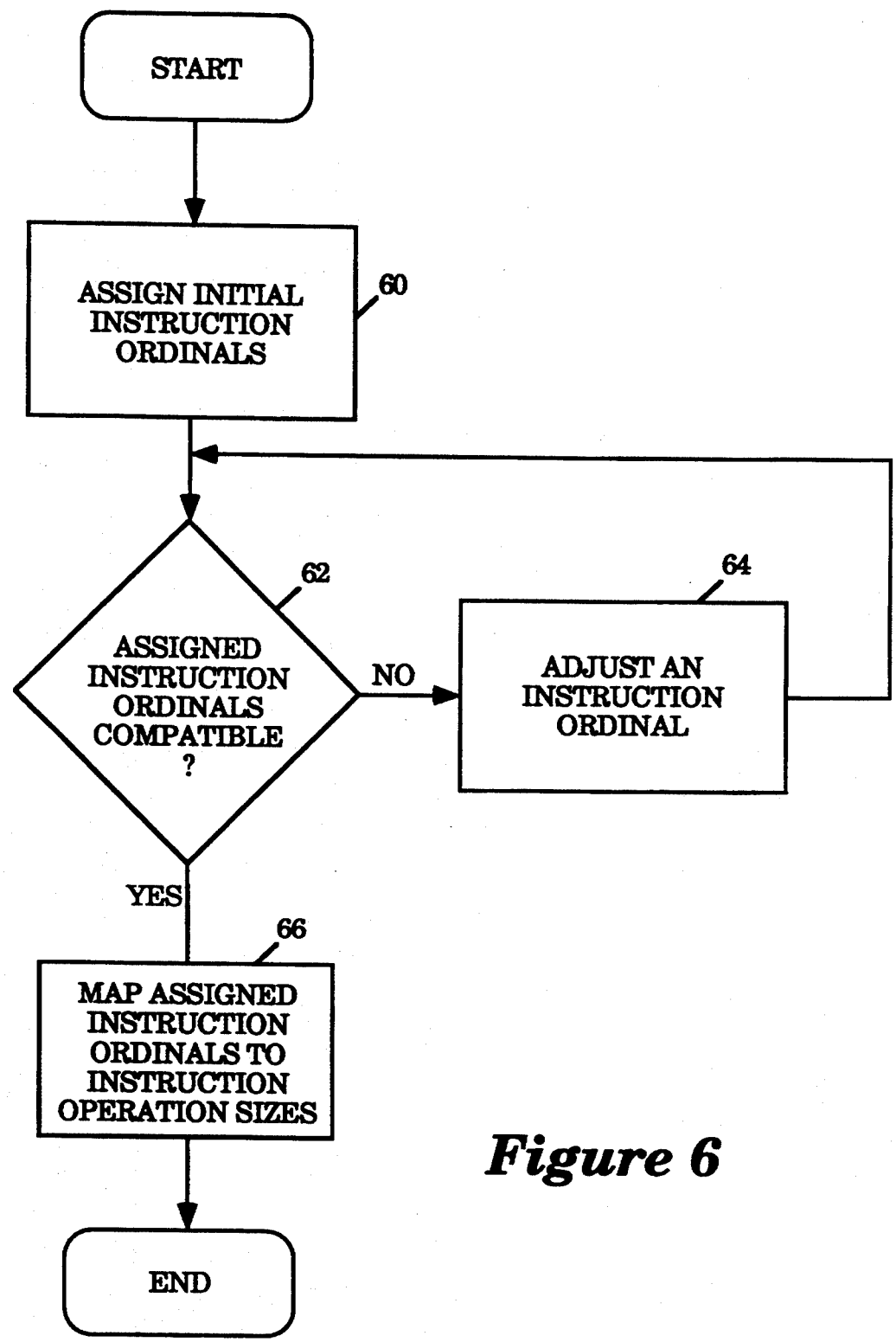
FIG. 6 illustrates the operation flow of the improved optimizer of FIG. 5.

Referring now to FIGS. 5-6, two block diagrams illustrating the improved optimizer of FIG. 4 and its operation flow for optimizing instruction operation sizes are shown. As illustrated in FIG. 5, the improved optimizer 46 has three associated sets of policies, 84, 88, and 89, for optimizing instruction operation sizes for the instructions being generated for the program being compiled. The first set of policies 84 is a set of policies for assigning initial instruction ordinals for various types of instructions. Instruction ordinals is a set of ordered properties used by the improved optimizer 46 to determine the optimized instruction operation sizes. The initial instruction ordinal assignment policies 84 indirectly reflect the minimum instruction operation sizes of the target machine for the various types of instructions. The second set of policies 88 is a set of policies for adjusting the assigned instruction ordinals. The instruction ordinal adjustment policies 88 provide guidelines to avoid unnecessary extensions to data smaller than a word and the less efficient instruction operation sizes of the target machine, including appropriate replacement of sign-extended loads by the more efficient zero-extended loads. The third set of policies 89 is a set of policies for mapping the assigned instruction ordinals to instruction operation sizes.

As illustrated in FIG. 6, in addition to logic for performing standard optimizations, the improved optimizer further comprises logic for assigning initial instruction ordinals to instructions in the code being generated for the program being compiled in accordance with the assignment policies, and special contextual considerations for instruction operands, block 60. Particular example of special context consideration for instruction operands includes special consideration for operands involved in address calculations, and the value to be stored by a STORE instruction. The improved optimizer further comprises logic for iteratively adjusting the assigned instruction ordinals in accordance to the adjustment policies until they converge into a set of compatible optimized instruction ordinals, blocks 62 and 64, and mapping the assigned instruction ordinals to instruction operation sizes, block 66.

An exemplary set of instruction ordinals is illustrated in FIG. 9. The exemplary instruction ordinals 80 comprise a BYTEsize 82a, a SIGNBsize 82b, a BYTE_plus_size 82c, a HWsize 83d, a SIGNHsize 82e, a ZEROSsize 82f, a HW_plus_size 82g, a ZEROXsize 82h, a SIGNXsize 82i, and a WDsize 82j.

An exemplary set of initial assignment policies 84' is illustrated in FIG. 10. The exemplary policies 84' comprise exemplary initial assignment policies, 82a–82m, for thirteen exemplary instruction types. For examples, each instruction of the type Add, Sub, Etc., is to be initially assigned the instruction ordinal BYTE_plus_size 82a; each instruction of the type Stores is to be initially assigned an instruction ordinal corresponding to the size of the item to be stored, i.e. BYTEsize, HWsize or WDsize, 82g; and each instruction of the type enter constant is to be initially assigned WDsize, or SIGNHsize if the constant is between −8000 and 7fff, or HWsize if the constant is between 0 and 7fff, or SIGNBsize if the constant is between −80 and 7f, or BYTEsize if the constant is between 0 and 7f, 82j.

An exemplary set of instruction ordinal adjustment policies is illustrated in FIGS. 11a–11b. The exemplary policies, 88'a and 88'b, comprise exemplary adjustment policies, 90a–90m, for the thirteen exemplary instruction types. The exemplary policy 90m reflects a default policy of adjusting the instruction ordinal of an instruction (i_size) to the instruction ordinal being reconciled to (p_size) if i_size is less than p_size. Additionally, for certain instruction types, the general policy is modified by special considerations for the particular instruction types. For examples, the i_size of an instruction of the type STORES will not be adjusted 90g; the i_size of an instruction of the type ADD, SUB, etc., is to be adjusted to p_size if p_size is greater than i_size, or HW_plus_size if p_size is less than or equal to HW_plus_size or BYTE_plus_size if p_size is less than or equal to BYTE_plus_size, 90a; and the i_size of an instruction of the type enter constant is to be adjusted to p_size if p_size is greater than WDsize, or if the constant size is between −8000 and 7fff and p_size equals ZEROSsize, or if the constant size is between −8000 and 7fff and p_size is greater than HW_plus_size, or if the constant size is between −80 and 7f and p_size is greater than BYTE_plus_size, 90j.

An exemplary set of instruction ordinal mapping policies is illustrated in FIGS. 12a–12c. The exemplary policies 96 comprise exemplary mapping policies, 98a–98m, for the thirteen exemplary instruction types. The mapping policies, 98a–98m, specify the instruction operation size for the various instruction types under different conditions. Additionally, if appropriate, the mapping policies, 98a–98m, also provide for code to be inserted. The default instruction operation size is word when it is not specified by the mapping policies, 98a–98m. For examples, for a byte load sign extend instruction 98a, the operation size is byte, if i_size is greater than BYTE_plus_size, additional codes are to be inserted to sign-extend the 8-bit register to the 32-bit register; for a load instruction that is neither byte or 16-bit load 98e, the operation size is the original load size; for a move instruction 98i, if i_size is less than or equal to BYTE_plus_size, the operation size is byte (i.e. a byte move).

Figure 7:
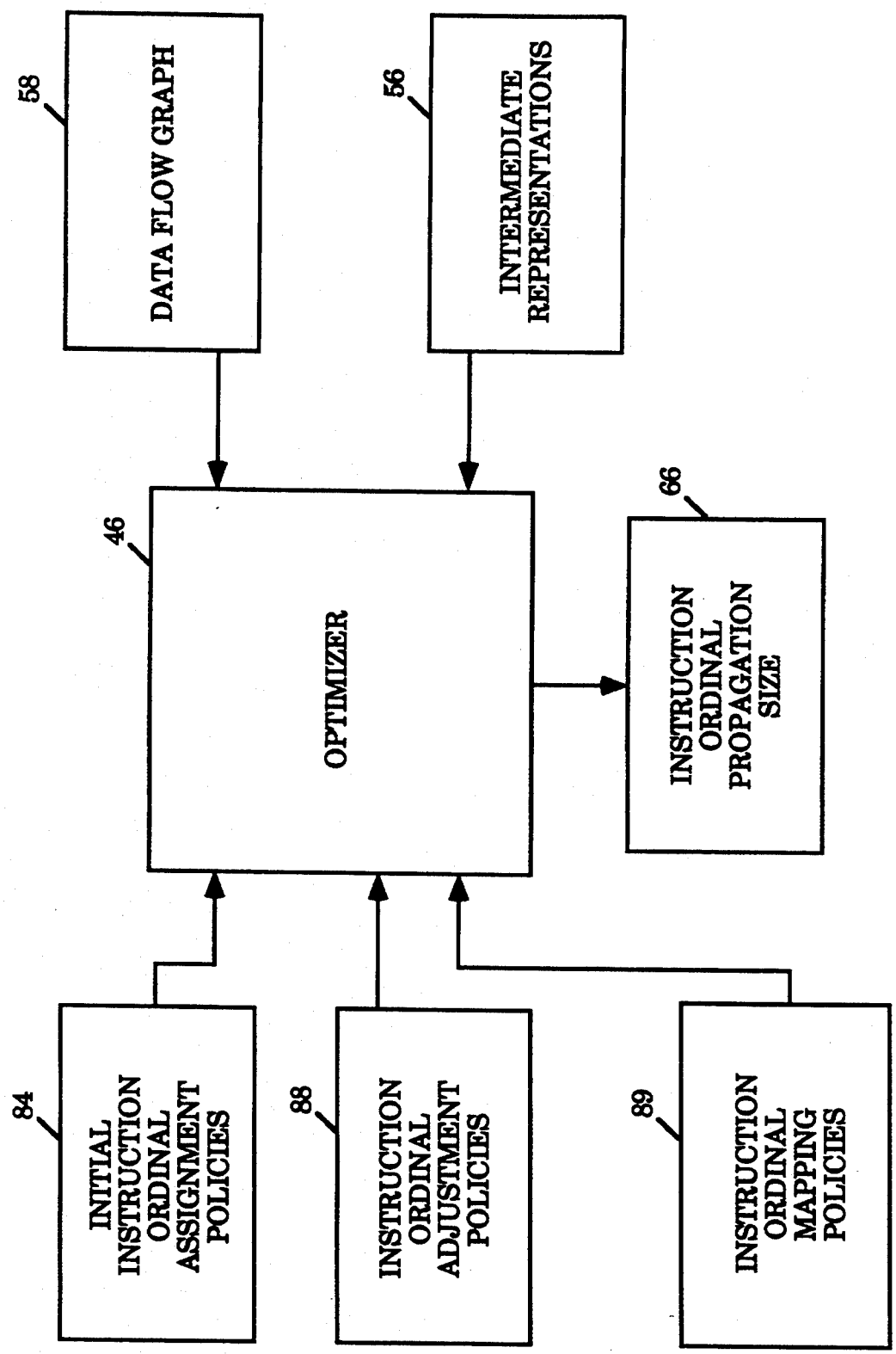
FIG. 7 illustrates one embodiment of the improved optimizer of FIG. 5.
Figure 8:
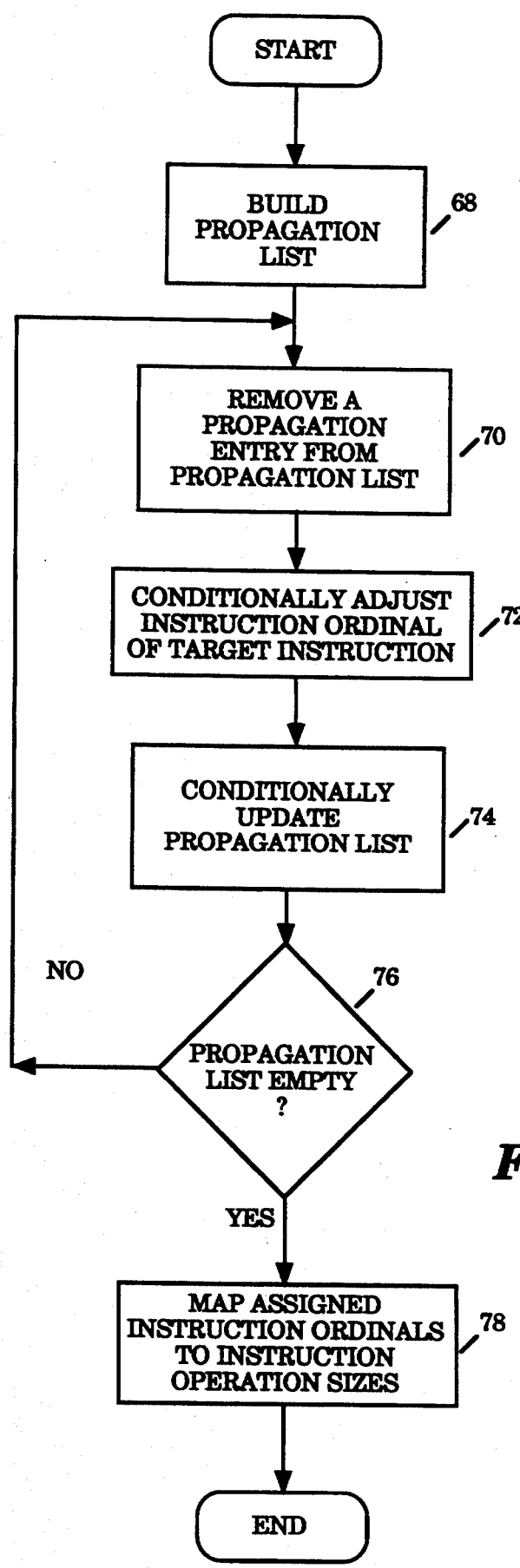
FIG. 8 illustrates the operation flow of the improved optimizer of FIG. 7 for iteratively adjusting the instruction ordinals until they converge into a set of compatible and optimized instruction ordinals.

Referring now to FIGS. 7-8, two block diagrams illustrating the presently preferred embodiment of the improved optimizer and its operation flow for optimizing instruction operation sizes are shown. As illustrated in FIG. 7, the presently preferred embodiment of the improved optimizer 46 iterates the instruction ordinal adjustments with a first-in-first-out instruction ordinal propagation list 66 comprising a plurality of instruction ordinal and propagation target pairs.

As illustrated in FIG. 8, the presently preferred embodiment of the improved optimizer constructs the initial instruction ordinal propagation list based on the initial instruction ordinal assignments, and the data flow relationship of the instructions, block 68. The optimizer then iteratively removes these instruction ordinal and propagation target pairs from the front of the list, one at a time, block 70, and conditionally adjusts the instruction ordinal of the propagation target in accordance to the adjustment policies, block 72. Each time an adjustment is made to the instruction ordinal of the target, one or more instruction ordinal propagation entries are added to the front of the instruction ordinal propagation list, block 74. The new instruction ordinal propagation entries correspond to the instructions generating operands for the adjusted instruction, and instructions using the result of the adjusted instruction. This process, blocks 70-76, continues until the optimizer has processed all instruction ordinal propagation entries in the list. Since no new entries are placed on the instruction ordinal propagation list when an instruction's operation size remained unchanged, thus eventually the list becomes empty. Then, the optimizer maps the final instruction ordinal assignments to actual instruction operation sizes, block 78.

Figure 13B:
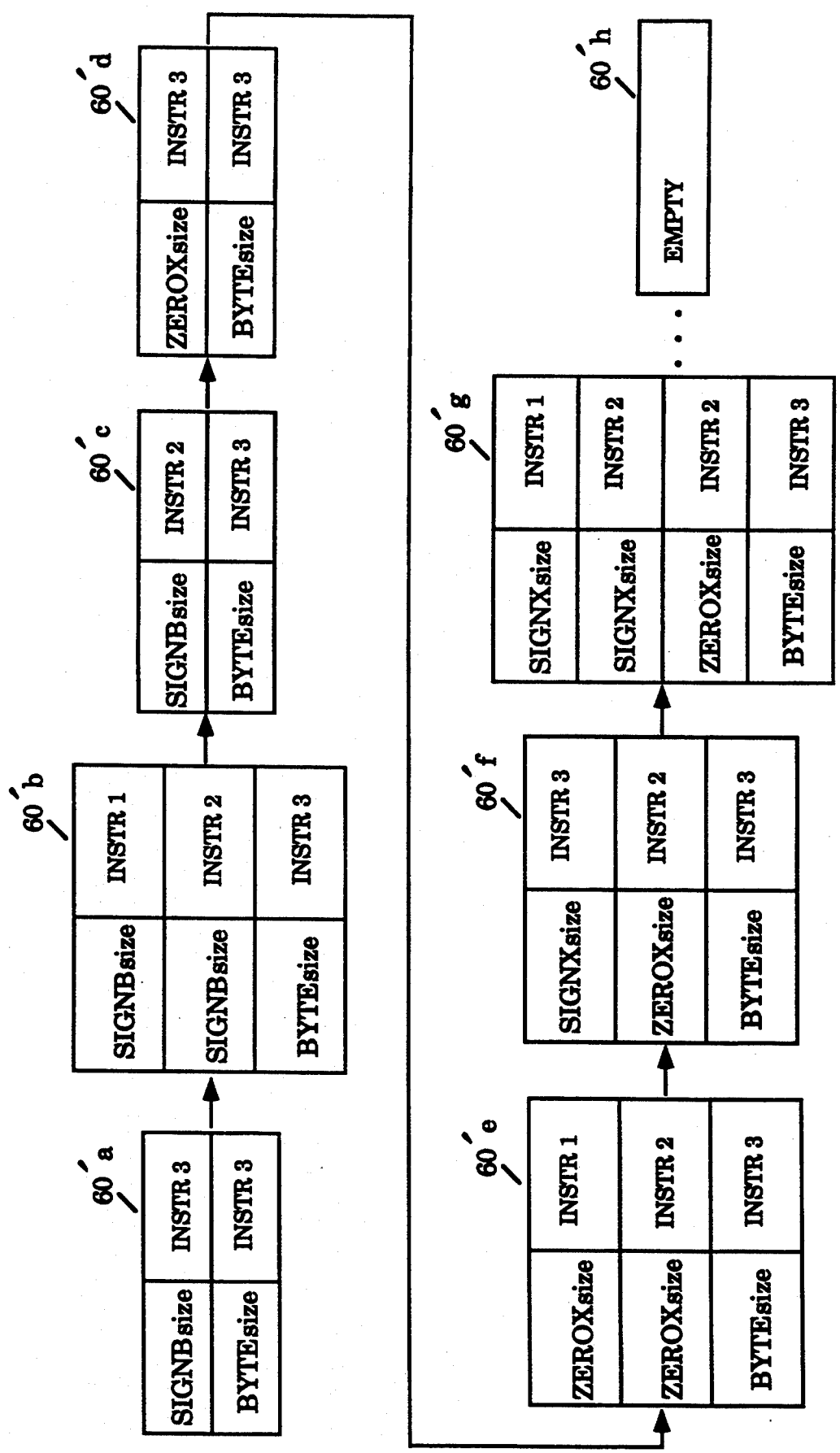

Referring now to FIGS. 13a-13b, two block diagrams illustrating an exemplary instruction operation size optimization under the presently preferred embodiment of the present invention are shown. The exemplary instruction operation size optimization illustrated assumes the optimizer supports the exemplary instruction ordinals illustrated in FIG. 9. Additionally, the exemplary optimization illustrated assumes the initial assignment, adjustment, and mapping policies provided to the optimizer are those illustrated in FIGS. 10, 11a-11b, and 12a-12c.

As illustrated in FIG. 13a, for this exemplary optimization, three exemplary instructions, 94a-94c, are involved. The three exemplary instructions comprise a byte sign extend load (instr-1) 94a, a byte zero extend load (instr-2) 94b, and a compare-gt (instr-3) 94c. The data flow from instr-1 94a and instr-2 94b to instr-3 94c. Thus, according to the exemplary initial assignment policies of FIG. 10, instr-1 and instr-2, 94a and 94b, are assigned instruction ordinal SIGNBsize and BYTEsize. Zero or no instruction ordinal is assigned to instr-3 94c.

As illustrated in FIG. 13b, the optimizer constructs the initial instruction ordinal propagation list 60'a comprising two instruction ordinal and propagation target pairs, the first pair indicating instruction ordinal SIGNBsize is to be propagated to instr-3 (because of instr-1), and the second pair indicating instruction ordinal BYTEsize is to be propagated to instr-3 (because of instr-2). Since instr-3 is assigned an instruction ordinal of zero, no propagation entry in the propagation list is necessary.

As described earlier, the optimizer first removes the first propagation entry "SIGNBsize, instr-3" from the initial propagation list 60'a, and processes the removed propagation entry. Since p_size equals SIGNBsize and i_size equals zero, p_size is greater than i_size. Thus, according to the adjustment policy for "compare-gt" illustrated in FIG. 11a-11b, the instruction ordinal of instr-3 94c is adjusted to SIGNBsize. Therefore, two new propagation entries "SIGNBsize, instr-1" and "SIGNBsize, instr-2" are added to the front of the propagation list, resulting in the new propagation list 60'b.

Next, the optimizer removes the frontmost propagation entry "SIGNBsize, instr-1" from the updated propagation list 60'b, and processes the removed propagation entry. Since p_size equals SIGNBsize, p_size is not greater than BYTE_plus_size. Thus, according to the adjustment policy for "byte sign extend load" illustrated in FIGS. 11a-11b, no adjustment is made to the instruction ordinal of instr-1 94a. Therefore, no new propagation entry is added to the front of the propagation list, resulting in the new propagation list 60'c.

Now, the optimizer removes the frontmost propagation entry "SIGNBsize, instr-2" from the updated propagation list 60'c, and processes the removed propagation entry. Since p_size equals SIGNBsize, thus, according to the adjustment policy for "byte zero extend load" illustrated in FIGS. 11a-11b, the instruction ordinal of instr-2 94b is adjusted to ZEROXsize. Therefore, a new propagation entry "ZEROXsize, instr-3" added to the front of the propagation list, resulting in the new propagation list 60'd.

The optimizer then removes the frontmost propagation entry "ZEROXsize, instr-3" from the updated propagation list 60'd, and processes the removed propagation entry. Since p_size equals ZEROXsize, and i_size equals SIGNBsize, p_size is greater than i_size and not equal ZEROSsize. Thus, according to the adjustment policy for "compare-gt" illustrated in FIGS. 11a-11b, the instruction ordinal of instr-3 94c is adjusted to ZEROXsize. Therefore, two new propagation entries "ZEROXsize, instr-1" and "ZEROXsize, instr-2" are added to the front of the propagation list, resulting in the new propagation list 60'e.

The optimizer then removes the frontmost propagation entry "ZEROXsize, instr-1" from the updated propagation list 60'e, and processes the removed propagation entry. Since p_size equals _ZEROXsize, p_size is greater than BYTE_plus_sign. Thus, according to the adjustment policy for "byte sign extend load" illustrated in FIGS. 11a-11b, the instruction ordinal of instr-1 94a is adjusted to SIGNXsize. Therefore, a new propagation entry "SIGNXsize, instr-3" is added to the front of the propagation list, resulting in the new propagation list 60'f.

The optimizer then removes the frontmost propagation entry "SIGNXsize, instr-3" from the updated propagation list 60'f, and processes the removed propagation entry. Since p_size equals SIGNXsize, and i_size equals ZEROXsize, p_size is greater than i_size and not equal ZEROSsize. Thus, according to the adjustment policy for "compare-gt" illustrated in FIGS. 11a-11b, the instruction ordinal of instr-3 94c is adjusted to SIGNXsize. Therefore, two new propagation entries "SIGNXsize, instr-1" and "SIGNXsize, instr-2" are added to the front of the propagation list, resulting in the new propagation list 60'g.

The process continues as previously described. However, from now on, each propagation entry removed from the propagation list results in no adjustment to the instruction ordinal of the propagation target. Thus, no new propagation entry is being added to the propagation list. As a result, after four more iterations, the propagation list 60'h becomes empty. The iteration process is terminated. The compatible and optimized set of instruction ordinals has been determined.

As illustrated in FIG. 13a, instr-1 94a having a final instruction ordinal assignment of SIGNXsize is mapped to an instruction operation size of one byte with additional code inserted, instr-2 94b having a final ordinal assignment of ZEROXsize is also mapped to an instruction operation size of one byte with additional code inserted, and instr-3 94c having a final ordinal assignment of SIGNXsize is mapped to an instruction operation size of one word with no additional code inserted. The code added for instr-1 and instr-2, 94a–94b, are inserted in accordance to the mapping policies illustrated in FIGS. 12a–12c.

In the above described example, the initial code sign extended and zero extended the original byte loads before the word compare is performed. The process determines whether the two extensions were necessary by first hypothesizing two byte loads. As this information was propagated, the process ended up concluding that both the sign-extend and the zero-extend were indeed necessary. However, if both loads of the above example were initially sign-extended (or zero-extended), the process would have determined that simple byte loads and a byte compare would have been sufficient. Furthermore, if the example had contained two sign-extended 16 bit loads and a compare-eq, the process would have determined that two zero-extended 16 bit loads and a 32 bit compare would be sufficient.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a plurality of instructions having multiple instruction operation sizes, and a source program to be compiled, an automated method implemented on said computer system for optimizing the instruction operation sizes to be used for said instructions, when generating said instructions for said source program while compiling said source program on said computer system, said automated method comprising the steps of:
   a) assigning a plurality of initial instruction ordinals representative of said instruction operation sizes to said instructions, upon generating said instructions for said source program being compiled, said assignment being made based on a set of predetermined initial instruction ordinal assignment policies, said predetermined assignment policies embodying logic for assigning initial instruction ordinals that are representative of minimal instruction operation sizes of said generated instructions, without regard to said assigned instruction ordinals' compatibility with one another;
   b) iteratively adjusting said instruction ordinal assignments until said assigned instruction ordinals converge into a set of assigned instruction ordinals compatible with one another, said iterative assignment adjustment being made based on a set of predetermined instruction ordinal assignment adjust policies, said predetermined assignment adjustment policies embodying logic for avoiding unnecessary assignment adjustments to instruction ordinals representative of the larger instruction operation sizes; and
   c) mapping said compatible instruction ordinals assigned to represented instruction operation sizes, conditionally inserting additional instructions to the generated instructions if necessary, based on a set of predetermined mapping policies, said predetermined mapping policies embodying logic for identifying the instruction operation sizes represented by the instruction ordinals and the necessary instruction insertions.

2. The automated method as set forth in claim 1, wherein said step b) comprises the steps of:
   b.0) performing data flow analysis on said generated instructions to identify all data flow related instructions requiring propagation of their assigned instruction ordinals to their data flow related instructions to achieve instruction ordinal compatibility;
   b.1) deriving a first-in-first-out instruction ordinal propagation list based on the results of said data flow analysis, said propagation list comprising a plurality of instruction ordinal and propagation target pairs, each pair identifying an instruction ordinal to be propagated and an instruction that is the immediate target of the particular propagation;
   b.2) removing the frontmost instruction ordinal and propagation target pair from said propagation list;
   b.3) conditionally adjusting the current instruction ordinal assignment of the propagation target instruction based on said predetermined assignment adjustment policies;
   b.4) adding one or more instruction ordinal and propagation target instruction pairs to the front of said propagation list if an assignment adjustment is made in said step b.3), said addition being made based on said newly adjusted instruction ordinal assignment of said propagation target instruction and the immediate data flow related instructions of said propagation target instruction; and
   b.5) repeating said steps b.2) through b.4) until said propagation list is empty.

3. The automated method as set forth in claim 1, wherein,
   said steps (a) through (c) are performed using instruction ordinals including, in ascending order, instruction ordinals BYTEsize, SIGNBsize, BYTE_plus_size, HWsize, SIGNHsize, ZEROSsize, HW_plus_size, ZEROXsize, SIGNXsize and WDsize representing an unsigned byte instruction operation size, a signed byte instruction operation size, a greater than 8-bit result from 8-bit operands instruction operation size, an unsigned short instruction operation size, a signed short instruction operation size, a signed short that can be used as unsigned short instruction operation size, a greater than 16-bit result from 16-bit operand instruction operation size, a zero extend before 32-bit operation instruction operation size, a sign extend before 32-bit operation instruction operation size, and a 32-bit instruction operation size respectively.

4. The automated method as set forth in claim 3, wherein, said step (a) through (c) are performed on instructions having instruction types including a Byte load sign extend instruction type;

said step (a) is performed with initial assignment policies embodying logic that assigns said SIGNBsize instruction ordinal to an instruction of said Byte load sign extend instruction type as its initial instruction ordinal assignment;

said step (b) is performed with assignment adjustment policies embodying logic that adjusts the current instruction ordinal assignment (i_size) of an instruction of said Byte load sign extend instruction type, that is the immediate target of an instruction ordinal being propagated (p_size), as follows:
   if (p_size>BYTE_plus_size) i_size=SIGNXsize; and said step (c) is performed with mapping policies embodying logic that maps the assigned instruction ordinal of an instruction of said Byte load sign extend instruction type and conditionally inserting one or more instructions as follows:

--- instruction operation size = a byte,
if (i_size) > BYTE_plus_size),
   add code to
      sign-extend an 8-bit register of the Byte load sign extend
         instruction to a 32-bit register.

---

5. The automated method as set forth in claim 3, wherein, said steps (a) through (c) are performed on instructions having instruction types including a Byte load zero extend instruction type;

said step (a) is performed with initial assignment policies embodying logic that assigns said BYTEsize instruction ordinal to an instruction of said Byte load zero extend instruction type as its initial instruction ordinal assignment;

said step (b) is performed with assignment adjustment policies embodying logic that adjusts the current instruction ordinal assignment (i_size) of an instruction of said Byte load zero extend instruction type, that is the immediate target of an instruction ordinal being propagated (p_size), as follows:
   if (p_size=SIGNBsize) i_size=ZEROXsize,
   if (p_size>BYTE_plus_size) i_size=ZEROXsize; and said step (c) is performed with mapping policies embodying logic that maps the assigned instruction ordinal of an instruction of said Byte load zero extend instruction type and conditionally inserting one or more instructions as follows:

--- instruction operation size = a byte,
if (i_size > BYTE_plus_size)
   add code to clear a register of the Byte load zero extend instruction.

---

6. The automated method as set forth in claim 1, wherein, said steps (a) through (c) are performed on instructions having instruction types including a 16-bit load sign extend instruction type;

said step (a) is performed with initial assignment policies embodying logic that assigns said SIGNHsize to an instruction of said 16-bit load sign extend instruction type as its initial instruction ordinal;

said step (b) is performed with assignment adjustment policies embodying logic that adjusts the current instruction ordinal assignment (i_size) of an instruction of said 16-bit load sign extend instruction type, that is the immediate target of an instruction ordinal being propagated (p_size), as follows:
   if (p_size=ZEROSsize) i_size=ZEROSsize,
   else if (p_size>HW_plus_size) i_size=SIGNXsize; and said step (c) is performed with mapping policies embodying logic that maps the assigned instruction ordinal of an instruction of said 16-bit load sign extend instruction type and conditionally inserting one or more instructions as follows:

--- if (i_size = ZEROSsize)
   instruction operation size = a word,
   add code to
      clear a result register of the instruction of said 16-bit
         load sign extend instruction type,
      load 16 bits into a right half of said result register,
else
   instruction operation size = half of a word
   if (i_size > HW_plus_size)
      add code to
         sign extend a 16-bit register of the instruction of
            said 16-bit load sign extend instruction type to a 32-bit register.

---

7. The automated method as set forth in claim 3, wherein, said steps (a) through (c) are performed on instructions having instruction types including a 16-bit load zero extend instruction type;

said step (a) is performed with initial assignment policies embodying logic that assigns said HWsize to an instruction of said 16-bit load zero extend instruction type as its initial instruction ordinal;

said step (b) is performed with assignment adjustment policies embodying logic that adjusts the current instruction ordinal assignment (i_size) of an instruction of said 16-bit load zero extend instruction type, that is the immediate target of an instruction ordinal being propagated (p_size), as follows:
   if (p_size=SIGNHsize) i_size=ZEROXsize,
   if (p_size=ZEROSsize) i_size=ZEROXsize,
   if (p_size>HW_plus_size) i_size=ZEROXsize; and said step (c) is performed with mapping policies embodying logic that maps the assigned instruction ordinal of an instruction of said 16-bit load zero extend instruction type and conditionally inserting one or more instructions as follows:

--- if (i_size <= HW_plus_size)
   instruction operation size = half of a word,
else
   instruction operation size = a word,
   add code to
      clear a result register of the instruction of said 16-bit
         load zero extend instruction type,
      load 16 bits into a right half of said result register.

---

8. The automated method as set forth in claim 3, wherein, said steps (a) through (c) are performed on instructions having instruction types including a non-Byte and non-16-bit load instruction type;

said step (a) is performed with initial assignment policies embodying logic that assigns said WDsize to an instruction of said non-Byte and non-16-bit load instruction type as its initial instruction ordinal;

said step (b) is performed with assignment adjustment policies embodying logic that adjusts the current instruction ordinal assignment (i_size) of an instruction of said non-Byte and non-16-bit load instruction type, that is the immediate target of an instruction ordinal being propagated (p_size), as follows:

if (p_size>i_size) i_size=p_size; and said step (c) is performed with mapping policies embodying logic that maps the assigned instruction ordinal of an instruction of said non-byte and non 16-bit load zero extend instruction type and conditionally inserting one or more instructions as follows:

instruction operation size=original load size.

9. The automated method as set forth in claim 3, wherein, said steps (a) through (c) are performed on instructions having instruction types including a STORE instruction type, said STORE instruction type comprising STORE instructions for storing data, each of said data being stored having a data size of a selected one of said BYTEsize, HWsize and WDsize;

said step (a) is performed with initial assignment policies embodying logic that assigns the size of the data being stored by an instruction of said STORE instruction type as its initial instruction ordinal;

said step (b) is performed with assignment adjustment policies embodying logic that does not adjust the current instruction ordinal assignment of an instruction of said STORE instruction type, that is the immediate target of an instruction ordinal being propagated; and said step (c) is performed with mapping policies embodying logic that maps the assigned instruction ordinal of an instruction of said STORE instruction type and conditionally inserting one or more instructions as follows:

instruction operation size=original store size.

10. The automated method as set forth in claim 3, wherein, said steps (a) through (c) are performed on instructions having instruction types including a sign extend convert instruction type, said sign extend convert instruction type comprising instructions for converting data to a selected one of said SIGNHsize and SIGNBsize;

said step (a) is performed with initial assignment policies embodying logic that assigns the size of the data being converted by an instruction of said sign extend convert instruction type as its initial instruction ordinal;

said step (b) is performed with assignment adjustment policies embodying logic that adjusts the current instruction ordinal assignment (i_size) an instruction of said sign extend convert instruction type, that is the immediate target of an instruction ordinal being propagated (p_size), as follows:

if (p_size>i_size) i_size=p_size; and said step (c) is performed with mapping policies embodying logic that maps the assigned instruction ordinal of an instruction of said sign extend convert instruction type and conditionally inserting one or more instructions as follows:

instruction operation size = one word;
if (i_size = ZEROSsize) treat said instruction of the sign extend convert instruction type as an instruction of a zero extend convert type,
if (i_size <= HW_plus_size and 16 bit extend and size(operand) <= HW_plus_size) delete the instruction of said sign extend convert instruction type,
if (i_size <= BYTE_plus_size and 24 bit extend and size(operand) <= BYTE_plus_size) delete the instruction of said sign extend convert instruction type.

11. The automated method as set forth in claim 3, wherein, said steps (a) through (c) are performed on instructions having instruction types including a zero extend convert instruction type, said zero extend convert instruction type comprising instructions for converting data to a selected one of said BYTEsize and HWsize;

said step (a) is performed with initial assignment policies embodying logic that assigns the size of the data being converted by an instruction of said zero extend convert instruction type as its initial instruction ordinal;

said step (b) is performed with assignment adjustment policies embodying logic that adjusts the current instruction ordinal assignment (i_size) an instruction of said zero extend convert instruction type, that is the immediate target of an instruction ordinal being propagated (p_size), as follows:

if (p_size>i_size) i_size=p_size; and said step (c) is performed with mapping policies embodying logic that maps the assigned instruction ordinal of an instruction of said zero extend convert instruction type and conditionally inserting one or more instructions as follows:

instruction operation size = one word;
if (i_size <= HW_plus_size and 16 bit extend and size(operand) <= HW_plus_size) delete the instruction of said zero extend convert instruction type,
if(i_size <= BYTE_plus_size and 24 bit extend and size(operand) <= BYTE_plus_size) delete the instruction of said zero extend convert instruction type.

12. The automated method as set forth in claim 3, wherein, said steps (a) through (c) are performed on instructions having instruction types including an enter constant instruction type, said enter constant instruction type comprising instructions for entering constants;

said step (a) is performed with initial assignment policies embodying logic that assigns the initial instruction ordinal of an instruction of said enter constant instruction type as follows:

WDsize,
if ($-8000 \leq n \leq 7fff$) then SIGNHsize,
if ($0 \leq n \leq 7fff$) then HWsize,
if ($-80 \leq n \leq 7f$) the SIGNBsize,
if ($0 \leq n \leq 7f$) then BYTEsize,
where n is said constant's value;

said step (b) is performed with assignment adjustment policies embodying logic that adjusts the current instruction ordinal assignment (i_size) an instruction of said enter constant instruction type, that is the immediate target of an instruction ordinal being propagated (p_size), as follows:

if (p_size>WDsize) i_size=p_size,
if (−8000≦n≦7fff and p_size=ZEROSsize)
  i_size=p_size,
if (−8000≦n≦7fff and p_size>HW_plus_size)
  i_size=p_size,
if (−80≦n≦7f and p_size>BYTE_plus_size)
  i_size=p_size; and said step (c) is performed with mapping policies embodying logic that maps the assigned instruction ordinal of an instruction of said enter constant instruction type and conditionally inserting one or more instructions as follows:

```
instruction operation size = a word,
if (i_size <= BYTE_plus_size)
    instruction operation size = a byte.
else if (i_size = ZEROSsize)
    constant = constant and 0xff
```

13. The automated method as set forth in claim 3, wherein,
said steps (a) through (c) are performed on instructions having instruction types including a first comparison instruction type (Compare-eq, ne);
said step (a) is performed with initial assignment policies embodying logic that does not assign an initial instruction ordinal to an instruction of said first comparison instruction type;
said step (b) is performed with assignment adjustment policies embodying logic that adjusts the current instruction ordinal assignment (i_size) an instruction of said first comparison instruction type, that is the immediate target of an instruction ordinal being propagated (p_size), as follows:

```
if (p_size > i_size) {
    i_size = p_size,
    if (p_size = HWsize) i_size = ZEROXsize,
    if (p_size = SIGNHsize) i_size = ZEROSsize,
    if (p_size = HW_plus_size or p_size = BYTE_plus_size)
        i_size = SIGNXsize; and
``` said step (c) is performed with mapping policies embodying logic that maps the assigned instruction ordinal of an instruction of said first comparison instruction type and conditionally inserting one or more instructions as follows:

```
instruction operation size = a word,
if (i_size <= BYTE_plus_size)
    instruction operation size = a byte.
```

14. The automated method as set forth in claim 3, wherein,
said steps (a) through (c) are performed on instructions having instruction types including a second comparison instruction type (Compare-gt, ge, lt, le);
said step (a) is performed with initial assignment policies embodying logic that does not assign an initial instruction ordinal to an instruction of said second comparison instruction type;
said step (b) is performed with assignment adjustment policies embodying logic that adjusts the current instruction ordinal assignment (i_size) an instruction of said second comparison instruction type that is the immediate target of an instruction ordinal being propagated (p_size), as follows:

```
if (p_size > i_size and p_size i = ZEROSsize) {
    i_size = p_size,
    if (i_size = HWsize) i_size = ZEROXsize,
    if (p_size = HW_plus_size or p_size = BYTE_plus_size)
        i_size = SIGNXsize; and
``` said step (c) is performed with mapping policies embodying logic that maps the assigned instruction ordinal of an instruction of said second comparison instruction type and conditionally inserting one or more instructions as follows:

```
instruction operation size = a word,
if (i_size = HW_size or i_size = SIGNHsize)
    add code to shift operands of the instruction of said second
        comparison instruction type 16 bits with zero fill,
else if (i_size < BYTE_plus_size)
    instruction operation size = a byte.
```

15. The automated method as set forth in claim 3, wherein,
said steps (a) through (c) are performed on instructions having instruction types including a move instruction type;
said step (a) is performed with initial assignment policies embodying logic that does not assign an initial instruction ordinal to an instruction of said move instruction type;
said step (b) is performed with assignment adjustment policies embodying logic that adjusts the current instruction ordinal assignment (i_size) an instruction of said move type that is the immediate target of an instruction ordinal being propagated (p_size), as follows:
if (p_size>i_size) i_size=p_size; and
said step (c) is performed with mapping policies embodying logic that maps the assigned instruction ordinal of an instruction of said move instruction type and conditionally inserting one or more instructions as follows:

```
instruction operation size = a word,
if (i_size = <BYTE_plus_size)
    instruction operation size = a byte.
```

16. A computer system comprising:
I) execution means for executing compiled programs comprising instructions that have multiple instruction operation sizes; and
II) optimizer means executed by said execution means, said optimizer means being equipped to optimize instruction operation sizes of said instructions when said instructions are being generated while a source program is being compiled, said optimizer means including
a) a set of predetermined initial instruction ordinal assignment policies for governing initial assignment of instruction ordinals representative of instruction operation sizes to said instructions, said predetermined assignment policies embodying logic that assigns initial instruction ordinals which are representative of minimal instruction operation sizes of said instructions, without regard to the assigned instruction ordinals' compatibility with one another;

b) assignment means for assigning a plurality of initial instruction ordinals to said instructions, upon generating said instruction for said source program being compiled, said assignment being made based on said set of predetermined initial instruction ordinal assignment policies;

c) a set of predetermined instruction ordinal assignment adjustment policies for governing assignment adjustment of said assigned instruction ordinals, said predetermined assignment adjustment policies embodying logic that avoids unnecessary assignment adjustments to instruction ordinals representative of the larger instruction operation sizes;

d) adjustment means for iteratively adjusting said instruction ordinal assignments until said instruction ordinal assignments converge into a set of assigned instruction ordinals compatible with one another, said iterative assignment adjustment being made based on said set of predetermined instruction ordinal assignment adjustment policies;

e) a set of predetermined instruction ordinal mapping policies for governing mapping of assigned instruction ordinals to represented instruction operation sizes, said predetermined mapping policies embodying logic that identifies the instruction operation sizes represented by the instruction ordinals and necessary instruction insertions; and f) mapping means for mapping said compatible instruction ordinals to represented instruction operation sizes, and conditionally inserting additional instructions to the generated instructions if necessary, based on said set of predetermined mapping policies.

17. The computer system as set forth in claim 16, wherein, said adjustment means iteratively adjusts said instruction ordinal assignments by performing data flow analysis on said generated instructions to identify all data flow related instructions requiring propagation of their assigned instruction ordinals to their data flow related instructions to achieve instruction ordinal compatibility;

deriving a first-in-first-out instruction ordinal propagation list based on the results of said data flow analysis, said propagation list comprising a plurality of instruction ordinal and propagation target pairs, each pair identifying an instruction ordinal to be propagated and an instruction that is the immediate target of the particular propagation;

removing the frontmost instruction ordinal and propagation target instruction pair from said propagation list;

conditionally adjusting the current instruction ordinal assignment of the propagation target instruction based on said predetermined assignment adjustment policies;

adding one or more instruction ordinal and propagation target instruction pair to the front of said propagation list if an assignment adjustment is made, said addition being made based on said newly adjusted instruction ordinal assignment of said propagation target instruction and the immediate data flow related instruction of said propagation target instruction; and repeating said removal, said conditional assignment adjustment, and said conditional instruction insertions, until said propagation list is empty.

18. The computer system as set forth in claim 16, wherein, said assignment, adjustment and mapping means use instruction ordinals including, in ascending order, instruction ordinals BYTEsize, SIGNBsize, BYTE_plus_size, HWsize, SIGNHsize, ZEROSsize, HW_plus_size, ZEROXsize, SIGNXsize and WDsize representing an unsigned byte instruction operation size, a signed byte instruction operation size, a greater than 8-bit result from 8-bit operands instruction operation size, an unsigned short instruction operation size, a signed short instruction operation size, a signed short that can be used as unsigned short instruction operation size, a greater than 16-bit result from 16-bit operand instruction operation size, a zero extend before 32-bit operation instruction operation size, a sign extend before 32-bit operation instruction operation size, and a 32-bit instruction operation size respectively.

19. The computer system as set forth in claim 18, wherein, said assignment, adjustment and mapping means process instructions having instruction types including a Byte load sign extend instruction type;

said assignment means employs initial assignment policies embodying logic that assigns said SIGNBsize instruction ordinal to an instruction of said Byte load sign extend instruction type as its initial instruction ordinal assignment;

said adjustment means employs assignment adjustment policies embodying logic that adjusts the current instruction ordinal assignment (i_size) of an instruction of said Byte load sign extend instruction type that is the immediate target of an instruction ordinal being propagated (p_size), as follows:
if (p_size>BYTE_plus_size) i_size=SIGNXsize; and said mapping means employs mapping policies embodying logic that maps the assigned instruction ordinal of an instruction of said Byte load sign extend instruction type and conditionally inserting one or more instructions as follows:

---
instruction operation size = a byte,
if (i_size) > BYTE_plus_size),
   add code to
      sign-extend an 8-bit register of the Byte load sign extend
         instruction to a 32-bit register.

---

20. The computer system as set forth in claim 18, wherein, said assignment, adjustment and mapping means process instructions having instruction types including a Byte load zero extend instruction type;

said assignment means employs initial assignment policies embodying logic that assigns said BYTEsize instruction ordinal to an instruction of said Byte load zero extend instruction type as its initial instruction ordinal assignment;

said adjustment means employs assignment adjustment policies embodying logic that adjusts the current instruction ordinal assignment (i_size) of an instruction of said Byte load zero extend instruction type, that is the immediate target of an instruction ordinal being propagated (p_size), as follows:
if (p_size=SIGNBsize) i_size=ZEROXsize,
if (p_size>BYTE_plus_size) i_size=ZEROXsize; and said mapping means employs mapping policies embodying logic that maps the assigned instruction ordinal of an instruction of said Byte load zero extend instruction type and conditionally inserting one or more instructions as follows:

```
instruction operation size = a byte,
if (i_size > BYTE_plus_size)
    add code to clear a register of the Byte load zero extend
        instruction.
```

21. The computer system as set forth in claim 18, wherein,
said assignment, adjustment and mapping means process instructions having instruction types including a 16-bit load sign extend instruction type;
said assignment means employs initial assignment policies embodying logic that assigns said SIGNHsize to an instruction of said 16-load sign extend instruction type as its initial instruction ordinal;
said adjustment means employs assignment adjustment policies embodying logic that adjusts the current instruction ordinal assignment (i_size) of an instruction of said 16-bit load sign extend instruction type, that is the immediate target of an instruction ordinal being propagated (p_size), as follows:
if (p_size=ZEROSsize) i_size=ZEROSsize,
else if (p_size>HW_plus_size) i_size=SIGNXsize; and said mapping means employs mapping policies embodying logic that maps the assigned instruction ordinal of an instruction of said 16-bit load sign extend instruction type and conditionally inserting one or more instructions as follows:

```
if (i_size = ZEROSsize)
    instruction operation size = a word,
    add code to
        clear a result register of the instruction of said 16-bit
            load sign extend instruction type,
        load 16 bits into a right half of said result register,
else
    instruction operation size = half of a word
    if (i_size > HW_plus_size)
        add code to
            sign extend a 16-bit register of the instruction of
                said 16-bit load sign extend instruction type to a
                32-bit register.
```

22. The computer system as set forth in claim 18, wherein,
said assignment, adjustment and mapping means process instructions having instruction types including a 16-bit load zero extend instruction type;
said assignment means employs initial assignment policies embodying logic that assigns said HWsize to an instruction of said 16-bit load zero extend instruction type as its initial instruction ordinal;

said adjustment means employs assignment adjustment policies embodying logic that adjusts the current instruction ordinal assignment (i_size) of an instruction of said 16-bit load zero extend instruction type, that is the immediate target of an instruction ordinal being propagated (p_size), as follows:
if (p_size=SIGNHsize) i_size=ZEROXsize,
if (p_size=ZEROSsize) i_size=ZEROXsize,
if (p_size>HW_plus_size) i_size=ZEROXsize; and said mapping means employs mapping policies embodying logic that maps the assigned instruction ordinal of an instruction of said 16-bit load zero extend instruction type and conditionally inserting one or more instructions as follows:

```
if (i_size <= HW_plus_size)
    instruction operation size = half of a word,
else
    instruction operation size = a word,
    add code to
        clear a result register of the instruction of said 16-bit
            load zero extend instruction type,
        load 16 bits into a right half of said result register.
```

23. The computer system as set forth in claim 18, wherein,
said assignment, adjustment and mapping means process instructions having instruction types including a non-Byte and non-16-bit load instruction type;
said assignment means employs initial assignment policies embodying logic that assigns WDsize to an instruction of said non-Byte and non-16-bit load instruction type as its initial instruction ordinal;
said adjustment means employs assignment adjustment policies embodying logic that adjusts the current instruction ordinal assignment (i_size) of an instruction of said non-Byte and non 16-bit load instruction type, that is the immediate target of an instruction ordinal being propagated (p_size), as follows:
if (p_size>i_size) i_size=p_size; and said mapping means employs mapping policies embodying logic that maps the assigned instruction ordinal of an instruction of said non-byte and non 16-bit load zero extend instruction type and conditionally inserting one or more instructions as follows:
instruction operation size=original load size.

24. The computer system as set forth in claim 18, wherein,
said assignment, adjustment and mapping means process instructions having instruction types including a STORE instruction type, said STORE instruction type comprising STORE instructions for storing data, each of said data being stored having a data size of a selected one of said BYTEsize, HWsize and WDsize;
said assignment means employs initial assignment policies embodying logic that assigns the size of the data being stored by an instruction of said STORE instruction type as its initial instruction ordinal;
said adjustment means employs assignment adjustment policies embodying logic that does not adjust the current instruction ordinal assignment of an instruction of said STORE instruction type, that is the immediate target of an instruction ordinal being propagated; and said mapping means employs mapping policies embodying logic that maps the assigned instruction ordinal of an instruction of said STORE instruction type and conditionally inserting one or more instructions as follows:

instruction operation size = original store size.

25. The computer system as set forth in claim 18, wherein, said assignment, adjustment and mapping means process instructions having instruction types including a sign extend convert instruction type, said sign extend convert instruction type comprising instructions for converting data to a selected one of said SIGNHsize and SIGNBsize;

said assignment means employs initial assignment policies embodying logic that assigns the size of the data being converted by an instruction of said sign extend convert instruction type as its initial instruction ordinal;

said adjustment means employs assignment adjustment policies embodying logic that adjusts the current instruction ordinal assignment (i_size) an instruction of said sign extend convert instruction type, that is the immediate target of an instruction ordinal being propagated (p_size), as follows:

if (p_size > i_size) i_size = p_size; and said mapping means employs mapping policies embodying logic that maps the assigned instruction ordinal of an instruction of said sign extend convert instruction type and conditionally inserting one or more instructions as follows:

--- instruction operation size = one word;
if (i_size = ZEROSsize) treat said instruction of the sign extend convert
    instruction type as an instruction of a zero extend convert type,
if (i_size <= HW_plus_size and 16 bit extend and
    size(operand) <= HW_plus_size) delete the instruction of
    said sign extend convert instruction type,
if (i_size <= BYTE_plus_size and 24 bit extend and
    size(operand) <= BYTE_plus_size) delete the instruction of
    said sign extend convert instruction type.

---

26. The computer system as set forth in claim 18, wherein, said assignment, adjustment and mapping means process instructions having instruction types including a zero extend convert instruction type, said zero extend convert instruction type comprising instructions for converting data to a selected one of said BYTEsize and HWsize;

said assignment means employs initial assignment policies embodying logic that assigns the size of the data being converted by an instruction of said zero extend convert instruction type as its initial instruction ordinal;

said adjustment means employs assignment adjustment policies embodying logic that adjusts the current instruction ordinal assignment (i_size) an instruction of said zero extend convert instruction type, that is the immediate target of an instruction ordinal being propagated (p_size), as follows:

if (p_size > i_size) i_size = p_size; and said mapping means employs mapping policies embodying logic that maps the assigned instruction ordinal of an instruction of said zero extend convert instruction type and conditionally inserting one or more instructions as follows:

--- instruction operation size = one word;
if (i_size <= HW_plus_size and 16 bit extend and
    size(operand) <= HW_plus_size) delete the instruction of
    said zero extend convert instruction type,
if (i_size <= BYTE_plus_size and 24 bit extend and
    size(operand) <= BYTE_plus_size) delete the instruction of
    said zero extend convert instruction type.

---

27. The computer system as set forth in claim 18, wherein, said assignment, adjustment and mapping means process instructions having instruction types including an enter constant instruction type, said enter constant instruction type comprising instructions for entering constants;

said assignment means employs initial assignment policies embodying logic that assigns the initial instruction ordinal of an instruction of said enter constant instruction type as follows:

WDsize, if ($-8000 \leq n \leq 7\text{fff}$) then SIGNHsize, if ($0 \leq n \leq 7\text{fff}$) then HWsize, if ($-80 \leq n \leq 7\text{f}$) the SIGNBsize, if ($0 \leq n \leq 7\text{f}$) then BYTEsize, where n is said constant's value;

said adjustment means employs assignment adjustment policies embodying logic that adjusts the current instruction ordinal assignment (i_size) an instruction of said enter constant instruction type, that is the immediate target of an instruction ordinal being propagated (p_size), as follows:

if (p_size > WDsize) i_size = p_size, if ($-8000 \leq n \leq 7\text{fff}$ and p_size = ZEROSsize) i_size = p_size, if ($-8000 \leq n \leq 7\text{fff}$ and p_size > HW_plus_size) i_size = p_size, if ($-80 \leq n \leq 7\text{f}$ and p_size > BYTE_plus_size) i_size = p_size; and said mapping means employs mapping policies embodying logic that maps the assigned instruction ordinal of an instruction of said enter constant instruction type and conditionally inserting one or more instructions as follows:

--- instruction operation size = word,
if (i_size <= BYTE_plus_size)
    instruction operation size = a byte.
else if (i_size = ZEROSsize)
    constant = constant and 0xff

---

28. The computer system as set forth in claim 18, wherein, said assignment, adjustment and mapping means process instructions having instruction types including a first comparison instruction type (Compare-eq, ne);

said assignment means employs initial assignment policies embodying logic that does not assign an initial instruction ordinal to an instruction of said first comparison instruction type;

said adjustment means employs assignment adjustment policies embodying logic that adjusts the current instruction ordinal assignment (i_size) an instruction of said first comparison instruction type, that is the immediate target of an instruction ordinal being propagated (p_size), as follows:

```
if (p_size > i_size) {
  i_size = p_size,
  if (p_size = HWsize)i_size = ZEROXsize,
  if (p_size = SIGNHsize)i_size = ZEROSsize,
  if (p_size = HW_plus_size or p_size = BYTE_plus_size)
    i_size = SIGNXsize; and
``` said mapping means employs mapping policies embodying logic that maps the assigned instruction ordinal of an instruction of said first comparison instruction type and conditionally inserting one or more instructions as follows:

```
instruction operation size = a word,
if (i_size <= BYTE_plus_size)
  instruction operation size = a byte.
```

29. The computer system as set forth in claim 18, wherein,
said assignment, adjustment and mapping means process instructions having instruction types including a second comparison instruction type (Compare-gt, ge, lt, le);
said assignment means employs initial assignment policies embodying logic does not assign an initial instruction ordinal to an instruction of said second comparison instruction type;
said adjustment means employs assignment adjustment policies embodying logic that adjusts the current instruction ordinal assignment (i_size) an instruction of said second comparison instruction type, that is the immediate target of an instruction ordinal being propagated (p_size), as follows:

```
if (p_size > i_size and p_size != ZEROSsize) {
  i_size = p_size,
  if (i_size = HWsize)i_size = ZEROXsize,
  if (p_size = HW_plus_size or p_size = BYTE_plus_size)
    i_size = SIGNXsize; and
``` said mapping means employs mapping policies embodying logic that maps the assigned instruction ordinal of an instruction of said second comparison instruction type and conditionally inserting one or more instructions as follows:

```
instruction operation size = a word,
if (i_size = HW_size or i_size = SIGNHsize)
  add code to shift operands of the instruction of said second
    comparison instruction type 16 bits with zero fill,
else if (i_size < BYTE_plus_size)
  instruction operation size = a byte.
```

30. The computer system as set forth in claim 18, wherein,
said assignment, adjustment and mapping means process instructions having instruction types including a move instruction type;
said assignment means employs initial assignment policies embodying logic that does not assign an initial instruction ordinal to an instruction of said move instruction type;
said adjustment means employs assignment adjustment policies embodying logic that adjusts the current instruction ordinal assignment (i_size) an instruction of said move type, that is the immediate target of an instruction ordinal being propagated (p_size), as follows:
  if (p_size>i_size) i_size=p_size; and
said mapping means employs mapping policies embodying logic that maps the assigned instruction ordinal of an instruction of said move instruction type and conditionally inserting one or more instructions as follows:

```
instruction operation size = a word,
if (i_size = <BYTE_plus_size)
  instruction operation size = a byte.
```

31. The automated method as set forth in claim 3, wherein,
said steps (a) though (c) are performed on instructions having instruction types including an arithmetic and like operation instruction type (Add, Sub, etc.);
said step (a) is performed using initial assignment policies embodying logic that assigns said BYTE_plus_size instruction ordinal to an instruction of said Add, Sub, etc. instruction type as its initial instruction ordinal assignment;
said step (b) is performed using assignment adjustment policies embodying logic that adjusts the current instruction ordinal assignment (i_size) of an instruction of said Add, Sub, etc. instruction type that is the immediate target of an instruction ordinal being propagated (p_size) as follows:

```
if (p_size > i_size) {
  i_size = p_size,
  if (p_size <= HW_plus_size)i_size = HW_plus_size,
  if (p_size <= BYTE_plus_size)i_size = BYTE_plus_size,
};and
``` said step (c) is performed using mapping policies embodying logic that maps the assigned instruction ordinal of an instruction of said Add, Sub etc. instruction type and conditionally inserting one or more instructions as follows:

```
instruction operation size = a word,
if (i_size <= BYTE_plus_size and the instruction has
  a byte version),
  instruction operation size = byte.
```

32. The improved computer system as set forth in claim 18, wherein,
said assignment, adjustment and mapping means process instructions having instruction types including an arithmetic and like operation instruction type (Add, Sub, etc.);
said assignment means employs initial assignment policies embodying logic that assigns said BYTE_plus_size instruction ordinal to an instruction of said Add, Sub, etc. instruction type as its initial instruction ordinal assignment;
said adjustment means employs assignment adjustment policies embodying logic that adjusts the current instruction ordinal assignment (i_size) of an instruction of said Add, Sub, etc. instruction type that is the immediate target of an instruction ordinal being propagated (p_size) as follows:

```
if (p_size > i_size) {
  i_size = p_size,
  if (p_size <= HW_plus_size)i_size = HW_plus_size,
  if (p_size <= BYTE_plus_size)i_size = BYTE_plus_size,
};and
``` said mapping means employs mapping policies embodying logic that maps the assigned instruction ordinal of an instruction of said Add, Sub etc. instruction type and conditionally inserting one or more instructions as follows:

```
instruction operation size = a word,
  if (i_size <= BYTE_plus_size and the instruction
    has a byte version),
    instruction operation size = a byte.
```

* * * * *

UNITED STATES PATENT AND TRADEMARK OFFICE
CERTIFICATE OF CORRECTION

PATENT NO. : 5,418,959

DATED : May 23, 1995

INVENTOR(S) : Smith et al.

Page 1 of 2

It is certified that error appears in the above-indentified patent and that said Letters Patent is hereby corrected as shown below:

In column 3, at line 34, delete "sill" and substitute --will--.

In column 6, at line 11, delete "HWsize 83d," and substitute --HWsize 82d,--.

In column 8, at line 47, delete "_ZEROXsize," and substitute --ZEROXsize,--.

In column 10, at line 3, delete "adjust" and substitute --adjustment--.

In column 16, at line 11, delete "i =" and substitute --!=--.

In column 19, at line 29, delete "16-load sign" and substitute --16-bit load sign--.

In column 20, at line 33, delete "assigns WDsize" and substitute --assigns said WDsize--.

In column 22, at line 49, delete "size = word" and substitute --size = a word--.

UNITED STATES PATENT AND TRADEMARK OFFICE
CERTIFICATE OF CORRECTION

PATENT NO. : 5,418,959
DATED : May 23.
INVENTOR(S) : Smith et al.

It is certified that error appears in the above-indentified patent and that said Letters Patent is hereby corrected as shown below:

In column 24, at line 49, delete "size = byte" and substitute
--size = a byte --.

Signed and Sealed this

Twenty-ninth Day of October 1996

Attest:

BRUCE LEHMAN

*Attesting Officer*   *Commissioner of Patents and Trademarks*